United States Patent [19]

Ito et al.

[11] 4,000,666
[45] Jan. 4, 1977

[54] MEANS FOR ACTUATING BALANCER OF ENGINE

[75] Inventors: Tadahiko Ito, Nagaokakyo; Yoshinori Shiomi, Kameoka; Seizo Iwasa, Kyoto, all of Japan

[73] Assignee: Mitsubishi Jidosha Kogyo Kabushiki Kaisha, Tokyo, Japan

[22] Filed: Feb. 27, 1975

[21] Appl. No.: 553,465

[30] Foreign Application Priority Data

July 24, 1974 Japan .................. 49-85453

[52] U.S. Cl. .................. 74/604; 123/192 B; 184/6.28
[51] Int. Cl.² ........................ F16F 15/10
[58] Field of Search .................. 74/604; 123/192 B; 184/6.28

[56] References Cited
UNITED STATES PATENTS

| 1,898,459 | 2/1933 | Newcomb | 74/604 |
|---|---|---|---|
| 2,807,249 | 9/1957 | Peras | 74/604 X |
| 2,838,957 | 6/1958 | Johnson | 74/604 |
| 2,914,963 | 12/1959 | Scherenberg | 74/604 |
| 2,914,964 | 12/1959 | Bensinger et al. | 74/604 |
| 3,511,110 | 5/1970 | Grieve | 74/604 |
| 3,710,774 | 1/1973 | Weseloh et al. | 123/192 B |

Primary Examiner—Samuel Scott
Assistant Examiner—F. D. Shoemaker
Attorney, Agent, or Firm—Oldham & Oldham Co.

[57] ABSTRACT

Means for actuating a balancer of an engine including a crankshaft, pistons and connecting rods, comprising a pair of balancer shafts located opposite sides of the crankshaft and actuated thereby. One of the balancer shafts is formed to serve for a rotatable shaft of a subsidiary device of the engine, such as an oil pump, an air pump, a dynamo or a water pump.

5 Claims, 9 Drawing Figures

1

MEANS FOR ACTUATING BALANCER OF ENGINE

BACKGROUND OF INVENTION

This invention relates to an improved means for actuating a balancer of an engine.

Generally, in an engine having a secondary balancer, it is necessary to rotate one of two balancer shafts positioned on opposite sides of a crankshaft in a reverse direction relative to the rotational direction of the crankshaft. To this end, it is necessary to provide special reversing mechanism for said one balancer shaft. The reversing mechanism includes a gear provided on one balancer shaft and an idle gear mounted on an idle gear shaft which is actuated through a sprocket provided thereon and a chain by the crankshaft.

Also, in a balancer in which a pair of balancer shafts rotate in the same direction relative to the rotational direction of the crankshaft, it is necessary to provide pullys, gears and sprockets on said balancer shafts and crank shaft to rotate the balancer shafts. In both cases, there are disadvantages that the entire construction of the engine is large and the cost thereof is high.

An oil pump used for supplying lubricant to the engine is actuated through an oil pump gear and an oil pump drive shaft which are provided on a cam shaft or crankshaft. The oil pump drive shaft is connected by a coupling to a drive gear shaft of the oil pump to actuate the latter. However, in long period of use, the coupling wears and has an undesirable play to cause it impacts or vibrations. In this result, discrepancies of clearance or wear arise between the drive gear shaft and a drive gear securely fitted thereon by a bush, at the engaging portions of the drive and driven gears and between said gears and a casing of the oil pump, thereby causing lack of the desired output pressure.

SUMMARY OF INVENTION

In order to avoid the above drawbacks, this invention provides means for actuating a balancer of an engine including a crankshaft, pistons and connecting rods, comprising a pair of balancer shafts located on opposite sides of said crankshaft and actuated thereby, each of said balancer shafts being provided with a balance weight for balancing the total reciprocating mass of said pistons and connecting rods, one of said balancer shafts being formed to serve as a rotatable shaft of a subsidiary device for the engine.

BRIEF DESCRIPTION OF THE DRAWINGS

The invention will be described by way of example with reference to the accompanying drawings in which.

DESCRIPTION OF THE PREFERRED EMBODIMENTS

Figure 1:
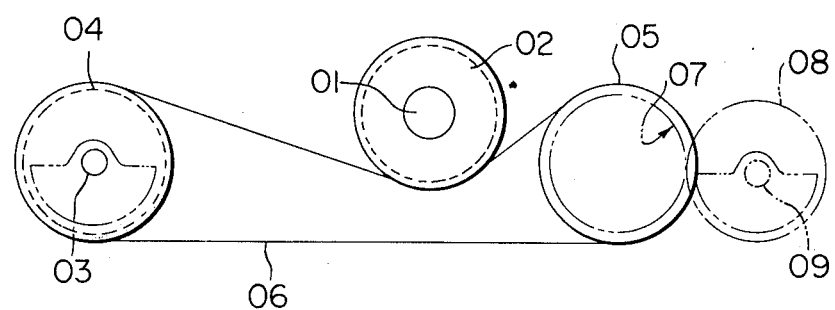
FIG. 1 shows an explanatory view of conventional means for actuating a balancer.

Referring to FIG. 1, the conventional secondary balancer includes a pair of balancer shafts 03 and 09 which are located on opposite sides of a crankshaft 01. The left hand side balancer shaft 03 is actuated through a sprocket 04 provided thereon, a sprocket 02 provided on the crankshaft 01 and a chain 06 and rotates in the same direction as the rotation of the crankshaft 01. The balancer shaft 09 must rotate in the opposite direction relative to the rotation of the crankshaft and is actuated through the reversing mechanism. The reversing mechanism comprises a gear 08 provided on the balancer shaft 09 and an idle gear 07 on an idle gear shaft, not shown. The idle gear 07 is actuated through a sprocket 05 provided on the idle gear shaft and the chain 06.

Figure 7:
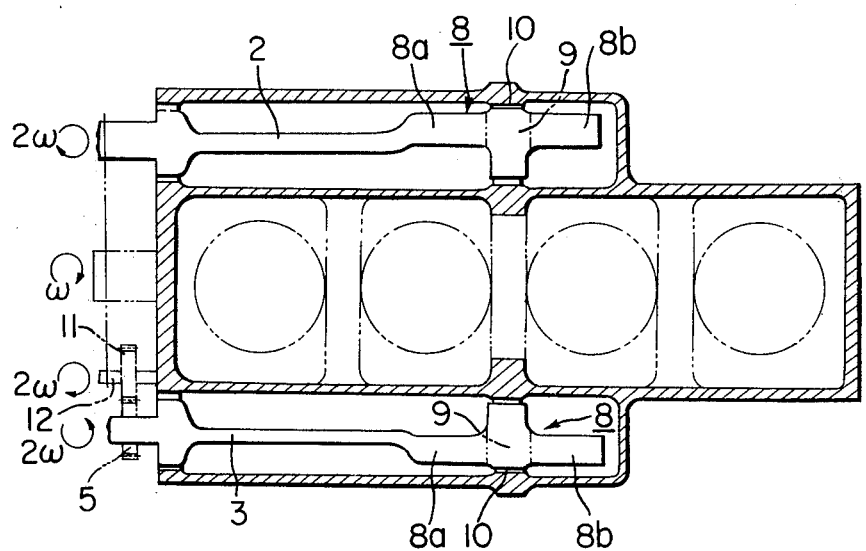
FIG. 7 shows a diagrammatic explanatory view showing a positional relationship of the balancer according to the invention with respect to the cylinder block.

Referring to FIGS. 2 to 7, there is shown the balancer according to the invention. The balancer includes a pair of balancer shafts 2 and 3 which are located opposite sides of a crankshaft, not shown. The left hand side balancer shaft 2 is actuated by the crankshaft through a sprocket 1 provided thereon, sprocket 2' attached to the balancer shaft 2 and a chain 20. The right hand side balancer shaft 3 is actuated through an oil pump 4 and formed to serve as a driven gear shaft thereof. Each of the balancer shafts has a balance weight 8 at a given axial location. The balance weight 8 is divided into two parts 8a and 8b with a journal portion 9 therebetween which is supported by one bearing 10, as shown in FIG. 7. Instead of the portion 9, the end of the balancer shaft adjacent to the balance weight 8 may be supported suitably in a well known manner.

Figure 5:
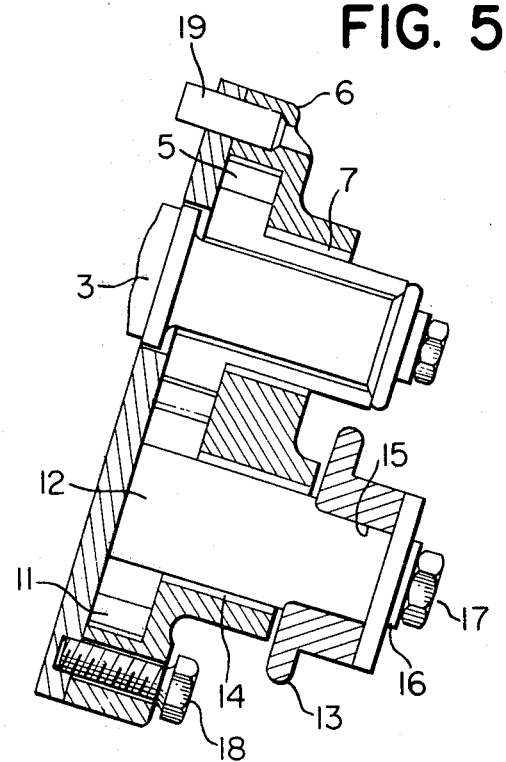
Figure 6:
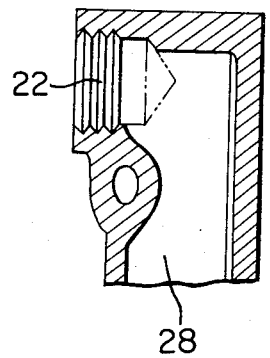

The oil pump 4 has a driven gear 5 mounted on said driven gear shaft 3 which is supported in an oil pump case 6 though the bearing 7 and a drive gear 11 mounted on a drive gear shaft 12 and engaged with the driven gear 5. The drive gear shaft 12 is actuated through a sprocket 13 and the chain 20 and drives the driven gear shaft or balancer shaft 3 in the reverse direction through the gears 11 and 5. The drive and driven gears 11 and 5 of the oil pump form the reversing mechanism for the balancer shaft 3. The sprocket 13 is fixed to the end 15 of the drive gear shaft 12 adjacent to the bearing 14 by a bolt 17 through a washer 16. The oil pump case 6 is secured to the cylinder block by bolts 18 (only one is shown in FIG. 5), and a pin 19 is provided for positioning the case 6 relative to the cylinder block.

Figure 4:
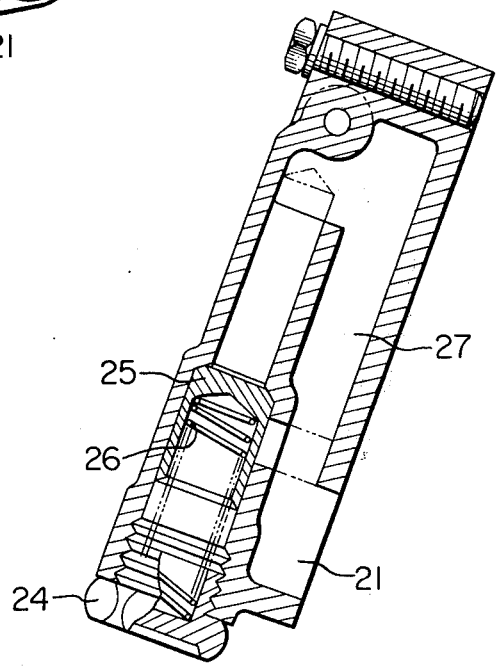

The oil pump 4 has an inlet port 21, and outlet port 22 and a relief valve 23 which, as shown in FIG. 4, is formed from a plug 24, a plunger 25 and a spring 26 as the conventional valve. The inlet port 21 is connected to an inlet passage 27 for supplying the oil to the oil pump gears 5 and 11, and the outlet port 22 is connected to an oil passage 28 communicating to the oil pump gears.

Figure 2:
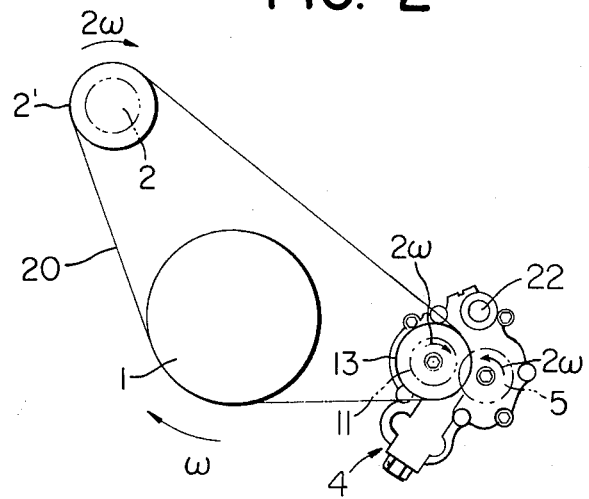
FIG. 2 shows a diagrammatic explanatory view of the means for actuating the balancer according to the invention.
Figure 3:
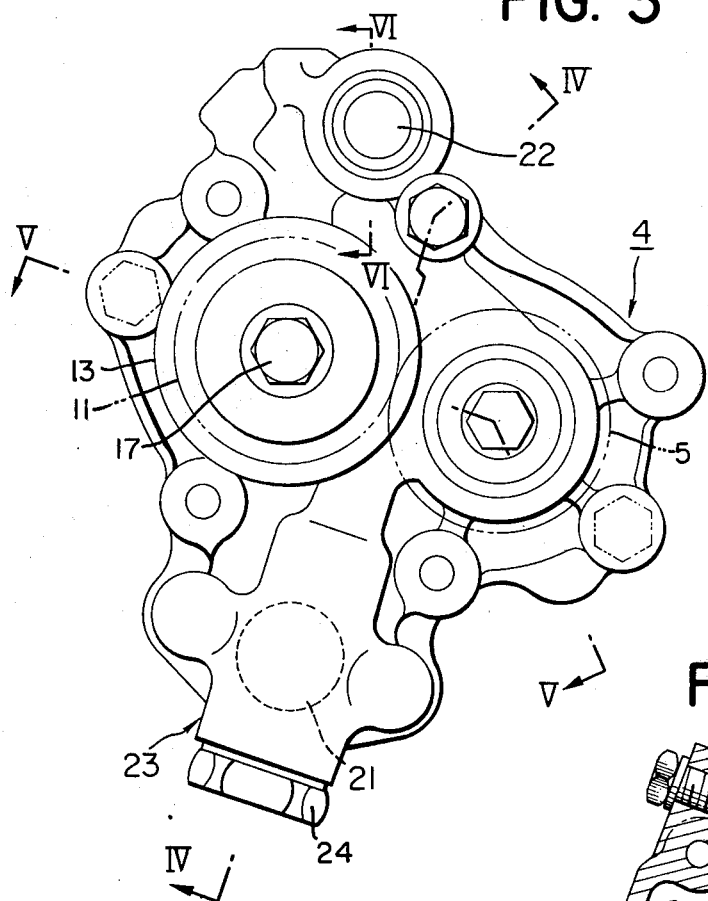
FIG. 3 shows an enlarged front view of an oil pump in FIG. 2, FIGS. 4 to 6 show respective cross sectional view taken along the lines IV—IV, V—V and VI—VI in FIG. 3.

The balancer according to the invention operates as follows:

When the engine starts, the crankshaft, not shown, rotates at the speed ω in the clockwise direction in FIG. 2. The sprocket 2' on the left hand side balancer shaft 2 rotates at the speed 2ω through the chain 20 and the sprocket 2', whereas the right hand side balancer shaft 3 is actuated in the opposite direction through the drive gear 11 mounted on the drive gear shaft 12 of the oil pump 4 and the sprocket 13. Thus, the balance weights 8 provided on the pair of balancer shafts 2 and 3 prevent the generation of vibrations of the engine and at the same time the oil pump 4 is actuated. When the pump 4 operates, the oil is sucked from the inlet port 21 and supplied to various parts of the engine from the outlet port 22 by the gears 5 and 11, thereby establishing lubrication of the engine. In this embodiment, the oil pump 4 is actuated by the actuating mechanism for the balancer and one of the balancer shafts is formed to serve for the driven gear shaft of the oil pump, so that the size of the engine is compacted and cost thereof is reduced. Also, the actuating mechanism for the oil pump, according to the invention, does not provide a coupling for connecting the oil pump drive shaft with the drive gear shaft. Therefore, the generation of impacts or vibrations due to the play or wear at the coupling connection, resulting in the wear of said gears of the oil pump and the discrepancy of clearance between the gears and the oil pump case, is prevented, thereby establishing smooth lubrication to the engine.

In this embodiment, the actuating mechanism for the balancer is arranged to reverse the rotation of one of the balancer shafts relative to the rotational direction of the crankshaft. However, if it is required to rotate said one balancer shaft in the same direction as the crankshaft, this balancer shaft may be used to serve for the drive gear shaft of the oil pump.

The same operational effect can be achieved by using one balancer shaft to serve as a rotatable shaft of a subsidiary device for the engine, such as an air pump for supplying secondary air, a dynamo or a water pump.

Also, in this embodiment, said one balancer shaft is used to serve for the driven gear shaft of the oil pump, but the same operational effect can be achieved by actuating one balancer shaft through the reversing mechanism which consists of the rotatable shaft of the air pump, dynamo or water pump and a gear provided on the rotatable shaft and engaged with the driven gear on the balancer shaft.

Furthermore, according to the invention, the balance weight 8 provided on each balancer shaft is divided into two parts 8a and 8b and supported by one bearing 10 through the journal portion 9, as shown in FIG. 7.

Therefore, the load of the balance weight does not effect the bearing positioned at the forward end of the balancer shaft, that is the bearing 7 for the driven gear shaft of the oil pump in this embodiment, so that it is unnecessary to provide a special bearing and the life of the oil pump will not be decreased.

Figure 8:
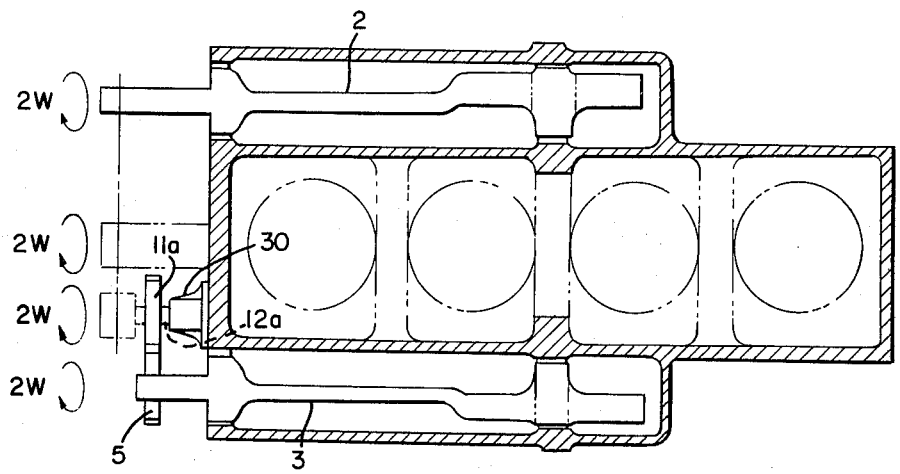
FIG. 8 is a diagrammatic view like FIG. 7, but showing the positioning of the water pump in relation to the balancer according to the invention and with respect to the cylinder block.

FIG. 8 shows a water pump 30 as operatively engaged with a drive shaft 12a positioning the gear 11a thereon, which engages with the drive gear 5 on the balancer shaft. This water pump 30 is secured to the frame of the engine in a conventional manner.

Figure 9:
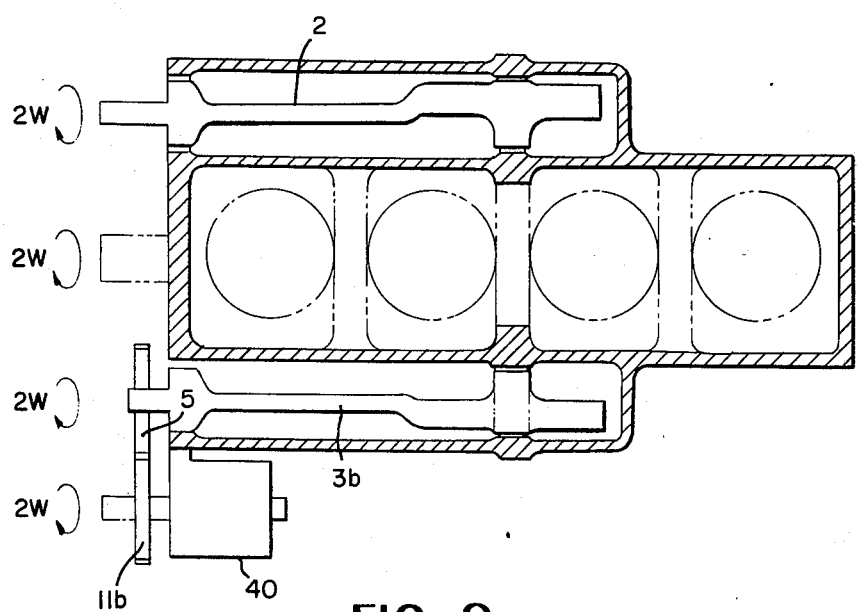
FIG. 9 is a diagrammatic explanatory view showing the positional relationship of the dynamo or air pump in relation to the balancer and cylinder block according to the present invention.

FIG. 9 is a diagrammatic view similar to FIG. 8, but showing how a dynamo 40, which is suitably secured to the engine housing of the engine of the invention and which has a driven gear 11b secured to the input shaft for the dynamo. This input shaft has a gear 11b thereon driven by a drive gear 5b on the balancer shaft 3b of the present invention. Likewise, an air pump could be provided and be of the same positioning and construction as shown for the dynamo 40 of FIG. 9.

What is claimed is:

1. Means for actuating a balancer of an engine, comprising at least one pair of balancer shafts located on opposite sides of a crankshaft of the engine at given distances from an axis of the crankshaft and driven by the crankshaft at a speed twice the speed thereof, the axes of said balancer shafts being substantially parallel to said axis of the crankshaft and being situated at different heights relative thereto, and reversing mechanism for rotating the lower one of said balancer shafts in a direction opposite to that of the crankshaft, said reversing mechanism including a first gear mounted on a rotatable shaft of a subsidiary device driven by said crankshaft and a second gear mounted on said lower balancer shaft and engaged with said first gear to rotate it in said opposite direction.

2. Means for actuating a balancer according to claim 1, wherein said subsidiary device is an oil pump and wherein said first and second gears are drive and driven gears mounted on drive and driven gear shafts of the pump respectively, said lower balancer shaft having a portion formed to serve as said driven gear shaft.

3. Means for actuating a balancer according to claim 1, wherein said subsidiary device is a water pump.

4. Means for actuating a balancer according to claim 1, wherein said subsidiary device is an air pump.

5. Means for actuating a balancer according to claim 1, wherein said subsidiary device is a dynamo.

* * * * *